United States Patent
Edo Ros

(10) Patent No.: US 11,787,402 B2
(45) Date of Patent: *Oct. 17, 2023

(54) VEHICLE COLLISION AVOIDANCE SYSTEM WITH ENHANCED PEDESTRIAN AVOIDANCE

(71) Applicant: MAGNA ELECTRONICS INC., Auburn Hills, MI (US)

(72) Inventor: Manuel Edo Ros, Kleinostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,789

(22) Filed: Feb. 6, 2023

(65) Prior Publication Data
US 2023/0182727 A1 Jun. 15, 2023

Related U.S. Application Data

(63) Continuation of application No. 17/643,880, filed on Dec. 13, 2021, now Pat. No. 11,572,065, which is a continuation of application No. 15/935,545, filed on Mar. 26, 2018, now Pat. No. 11,198,432, which is a
(Continued)

(51) Int. Cl.
*B60W 30/095* (2012.01)
*B60T 7/12* (2006.01)
*B60T 7/22* (2006.01)
*B60T 8/1755* (2006.01)
(Continued)

(52) U.S. Cl.
CPC ........... *B60W 30/0956* (2013.01); *B60T 7/12* (2013.01); *B60T 7/22* (2013.01); *B60T 8/17558* (2013.01); *B60W 30/09* (2013.01); *B60W 30/0953* (2013.01); *B60W 50/14* (2013.01); *B60T 2201/022* (2013.01); *B60W 2420/42* (2013.01); *B60W 2520/10* (2013.01);
(Continued)

(58) Field of Classification Search
CPC . B60W 30/0956; B60W 2420/42; B60T 7/12; B60T 7/22; B60T 8/17558; B60T 2201/022
USPC .......................................................... 701/70
See application file for complete search history.

(56) References Cited

U.S. PATENT DOCUMENTS

| 5,432,509 | A | * | 7/1995 | Kajiwara | ............... | B60Q 9/008 340/556 |
| 5,541,590 | A | | 7/1996 | Nishio | | |
| 5,550,677 | A | | 8/1996 | Schofield et al. | | |

(Continued)

*Primary Examiner* — Isaac G Smith
(74) *Attorney, Agent, or Firm* — HONIGMAN LLP

(57) ABSTRACT

A vehicular collision avoidance system includes a sensor disposed at a vehicle for sensing exterior and forwardly of the vehicle. A processor processes sensor data captured by the sensor to determine the presence of a pedestrian ahead of the vehicle and outside a path of travel of the vehicle. The processor determines a projected path of travel of the pedestrian based on movement of the pedestrian. The processor determines where the forward path of travel of the vehicle intersects the projected path of travel of the pedestrian. The system, responsive at least in part to prediction that the pedestrian will be in the forward path of travel of the vehicle when the vehicle time to intersection elapses, adjusts the speed of the vehicle based at least in part on attentiveness of a driver of the vehicle and a driving condition of the vehicle.

58 Claims, 11 Drawing Sheets

Related U.S. Application Data continuation of application No. 14/854,376, filed on Sep. 15, 2015, now Pat. No. 9,925,980.

(60) Provisional application No. 62/129,285, filed on Mar. 6, 2015, provisional application No. 62/051,446, filed on Sep. 17, 2014.

(51) Int. Cl.
    *B60W 30/09*    (2012.01)
    *B60W 50/14*    (2020.01)

(52) U.S. Cl.
    CPC ..... *B60W 2530/20* (2013.01); *B60W 2552/05* (2020.02); *B60W 2555/20* (2020.02); *B60W 2556/50* (2020.02)

(56) References Cited

U.S. PATENT DOCUMENTS

| | | |
|---|---|---|
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Ckert et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,178,034 B1 | 1/2001 | Allemand et al. |
| 6,223,114 B1 | 4/2001 | Boros et al. |
| 6,227,689 B1 | 5/2001 | Miller |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,317,057 B1 | 11/2001 | Lee |
| 6,320,282 B1 | 11/2001 | Caldwell |
| 6,333,759 B1 | 12/2001 | Mazzilli |
| 6,370,329 B1 | 4/2002 | Teuchert |
| 6,392,315 B1 | 5/2002 | Jones et al. |
| 6,430,303 B1 | 8/2002 | Naoi et al. |
| 6,442,465 B2 | 8/2002 | Breed et al. |
| 6,547,133 B1 | 4/2003 | Devries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,735,506 B2 | 5/2004 | Breed et al. |
| 6,744,353 B2 | 6/2004 | Sjonell |
| 6,762,867 B2 | 7/2004 | Lippert et al. |
| 6,795,221 B1 | 9/2004 | Urey |
| 6,819,231 B2 | 11/2004 | Berberich et al. |
| 6,823,241 B2 | 11/2004 | Shirato et al. |
| 6,889,161 B2 | 5/2005 | Winner et al. |
| 6,909,753 B2 | 6/2005 | Meehan et al. |
| 6,975,775 B2 | 12/2005 | Rykowski et al. |
| 6,989,736 B2 | 1/2006 | Berberich et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Diggins-Luthman |
| 7,724,962 B2 | 5/2010 | Zhu et al. |
| 7,952,490 B2 | 5/2011 | Fechner et al. |
| 8,027,029 B2 | 9/2011 | Lu et al. |
| 8,340,866 B2 | 12/2012 | Hanzawa et al. |
| 8,788,176 B1 | 7/2014 | Yopp |
| 8,849,495 B2 | 9/2014 | Chundrik, Jr. et al. |
| 9,090,234 B2 | 7/2015 | Johnson et al. |
| 9,092,986 B2 | 7/2015 | Salomonsson et al. |
| 9,196,164 B1 * | 11/2015 | Urmson ................ B60Q 1/547 |
| 9,925,980 B2 | 3/2018 | Edo Ros |
| 11,198,432 B2 | 12/2021 | Edo Ros |
| 11,572,065 B2 | 2/2023 | Edo Ros |
| 2002/0113873 A1 | 8/2002 | Williams |
| 2002/0118862 A1 | 8/2002 | Sugimoto et al. |
| 2003/0137586 A1 | 7/2003 | Lewellen |
| 2003/0222982 A1 | 12/2003 | Hamdan et al. |
| 2004/0022416 A1 | 2/2004 | Lemelson et al. |
| 2004/0114381 A1 | 6/2004 | Salmeen et al. |
| 2006/0018511 A1 | 1/2006 | Stam et al. |
| 2006/0018512 A1 | 1/2006 | Stam et al. |

(56) References Cited

U.S. PATENT DOCUMENTS

| | | |
|---|---|---|
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0255920 A1 | 11/2006 | Maeda et al. |
| 2006/0290479 A1 | 12/2006 | Akatsuka et al. |
| 2007/0104476 A1 | 5/2007 | Yasutomi et al. |
| 2008/0243389 A1 | 10/2008 | Inoue et al. |
| 2009/0093938 A1 | 4/2009 | Isaji et al. |
| 2009/0113509 A1 | 4/2009 | Tseng et al. |
| 2009/0171559 A1 | 7/2009 | Lehtiniemi et al. |
| 2009/0177347 A1 | 7/2009 | Breuer et al. |
| 2009/0244361 A1 | 10/2009 | Gebauer et al. |
| 2009/0265069 A1 | 10/2009 | Desbrunes |
| 2010/0020170 A1 | 1/2010 | Higgins-Luthman et al. |
| 2010/0228437 A1 | 9/2010 | Hanzawa et al. |
| 2011/0115615 A1 | 5/2011 | Luo et al. |
| 2011/0157309 A1 | 6/2011 | Bennett et al. |
| 2011/0224978 A1 | 9/2011 | Sawada |
| 2012/0035846 A1 | 2/2012 | Sakamoto et al. |
| 2012/0044066 A1 | 2/2012 | Mauderer et al. |
| 2012/0218412 A1 | 8/2012 | Dellantoni et al. |
| 2012/0262340 A1 | 10/2012 | Hassan et al. |
| 2013/0002873 A1 | 1/2013 | Hess |
| 2013/0116859 A1 | 5/2013 | Ihlenburg et al. |
| 2013/0124052 A1 | 5/2013 | Hahne |
| 2013/0129150 A1 | 5/2013 | Saito |
| 2013/0131918 A1 | 5/2013 | Hahne |
| 2013/0141578 A1 | 6/2013 | Chundrlik, Jr. et al. |
| 2013/0222593 A1 | 8/2013 | Byrne et al. |
| 2013/0278769 A1 | 10/2013 | Nix et al. |
| 2013/0314503 A1 | 11/2013 | Nix et al. |
| 2014/0044310 A1 | 2/2014 | Schamp et al. |
| 2014/0067206 A1 | 3/2014 | Pflug |
| 2014/0156157 A1 | 6/2014 | Johnson et al. |
| 2014/0222280 A1 | 8/2014 | Salomonsson et al. |
| 2014/0313339 A1 | 10/2014 | Diessner |
| 2014/0324330 A1* | 10/2014 | Minemura ............ G08G 1/166 701/300 |
| 2014/0379233 A1 | 12/2014 | Chundrlik, Jr. et al. |
| 2015/0166062 A1 | 6/2015 | Johnson et al. |
| 2015/0291159 A1 | 10/2015 | Sasabuchi |

\* cited by examiner

Considering the equations as follows:

Relationship of the time for both cases
$$CAt = TTC + VEt + SMt$$

The same distance driven in both cases:
$$DCm = V_0 \times TTC, \quad DCm = Dist_{BLt} + Dist_{BKt} + Dist_{DLt} + Dist_{RSt}$$

VEHICLE COLLISION AVOIDANCE SYSTEM WITH ENHANCED PEDESTRIAN AVOIDANCE

CROSS REFERENCE TO RELATED APPLICATIONS

The present application is a continuation of U.S. patent application Ser. No. 17/643,880, filed Dec. 13, 2021, now U.S. Pat. No. 11,572,065, which is a continuation of U.S. patent application Ser. No. 15/935,545, filed Mar. 26, 2018, now U.S. Pat. No. 11,198,432, which is a continuation of U.S. patent application Ser. No. 14/854,376, filed Sep. 15, 2015, now U.S. Pat. No. 9,925,980, which claims the filing benefits of U.S. provisional applications, Ser. No. 62/129,285, filed Mar. 6, 2015, and Ser. No. 62/051,446, filed Sep. 17, 2014, which are hereby incorporated herein by reference in their entireties.

FIELD OF THE INVENTION

The present invention relates generally to a collision avoidance system for a vehicle and, more particularly, to a collision avoidance system that detects pedestrians in or approaching.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more sensors, such as one or more cameras (preferably one or more CMOS cameras) to sense regions exterior (such as forward) of the vehicle and/or to capture image data representative of images exterior of the vehicle, and provides a pedestrian collision warning system that is operable to generate an alert or warning to a driver of the vehicle and/or to control the brake system of the vehicle responsive to a determination that the vehicle may collide with a pedestrian approaching the path of travel of the vehicle ahead of (or behind) the vehicle. The system may determine a baseline time to collision (TTC) based on vehicle speed and pedestrian speed and distance between the vehicle and pedestrian, and the system adjusts the TTC responsive to various parameters, including vehicle parameters (pertaining to traction or braking ability of the vehicle at that time), environmental parameters, location parameters (such as the location of the vehicle being at or near where a pedestrian is more likely to be found), condition/time/place parameters (such as the location of the vehicle being at or near a location and at a particular time where a pedestrian is more likely to be found at that location) and/or driver parameters (attentiveness of driver, distractions and/or the like). For example, when the vehicle is at a location near a bus stop when the bus is at the bus stop (thus a high likelihood that pedestrians will be present), the system may increase the sensitivity and provide an earlier warning to the driver of the vehicle or may control the vehicle (such as apply the vehicle brakes) at an earlier time, when it is determined that a pedestrian may be moving in or towards the path of travel of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
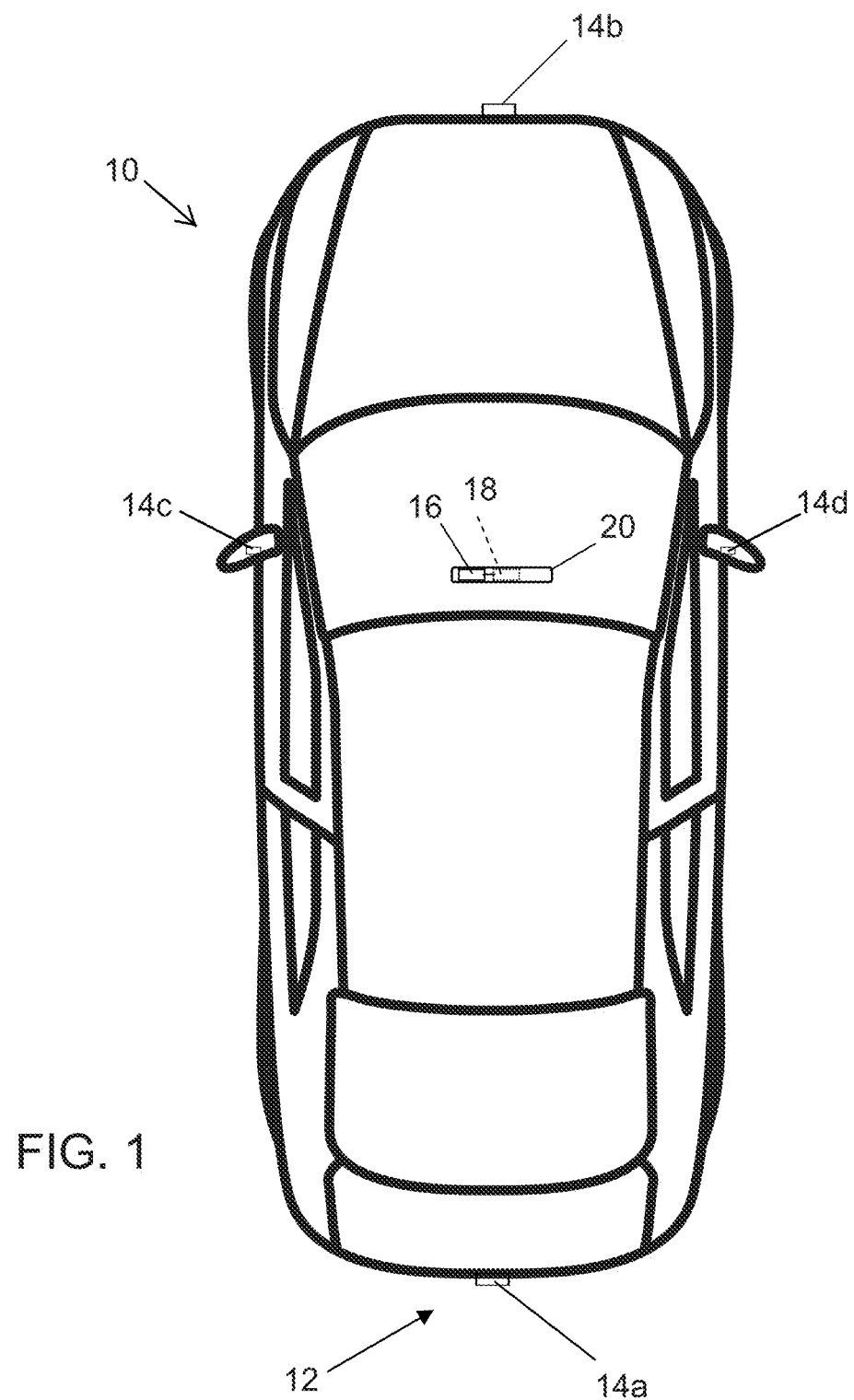
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

ASPECSS (Assessment methodologies for forward looking Integrated Pedestrian and further extension to Cyclist Safety Systems) is a project to develop harmonized test and assessment procedures for forward looking integrated pedestrian safety systems. See, for example, 'ASPECSS-D1.1-FINAL-Scenariosweighting-BASt-2013-02-17-PUBLIC', which is hereby incorporated herein by reference in its entirety.

As disclosed in the ASPECSS document (incorporated above), it may be justified to adjust the size of a safety zone depending on the pedestrian's walking speed. Therefore, the quantity safe lateral time-gap SLT is introduced. The conversion of safe lateral distance (SLD) to safe lateral time (SLT) is:

$$SLT = \frac{SLD}{v_{Ped}};$$

where $v_{Ped}$ is the speed component of a pedestrian lateral to the way an ego-vehicle is heading. This is linear vector algebra. ASPECSS shows that more distant pedestrians have to be reflected when they are approaching faster and less distant when they are approaching slower.

ASPECSS describes a safety zone which expands in a cone shape in front of the vehicle. The faster a potential endangered pedestrian is, the more time he or she may have to walk in front of the approaching vehicle.

Figure 2:
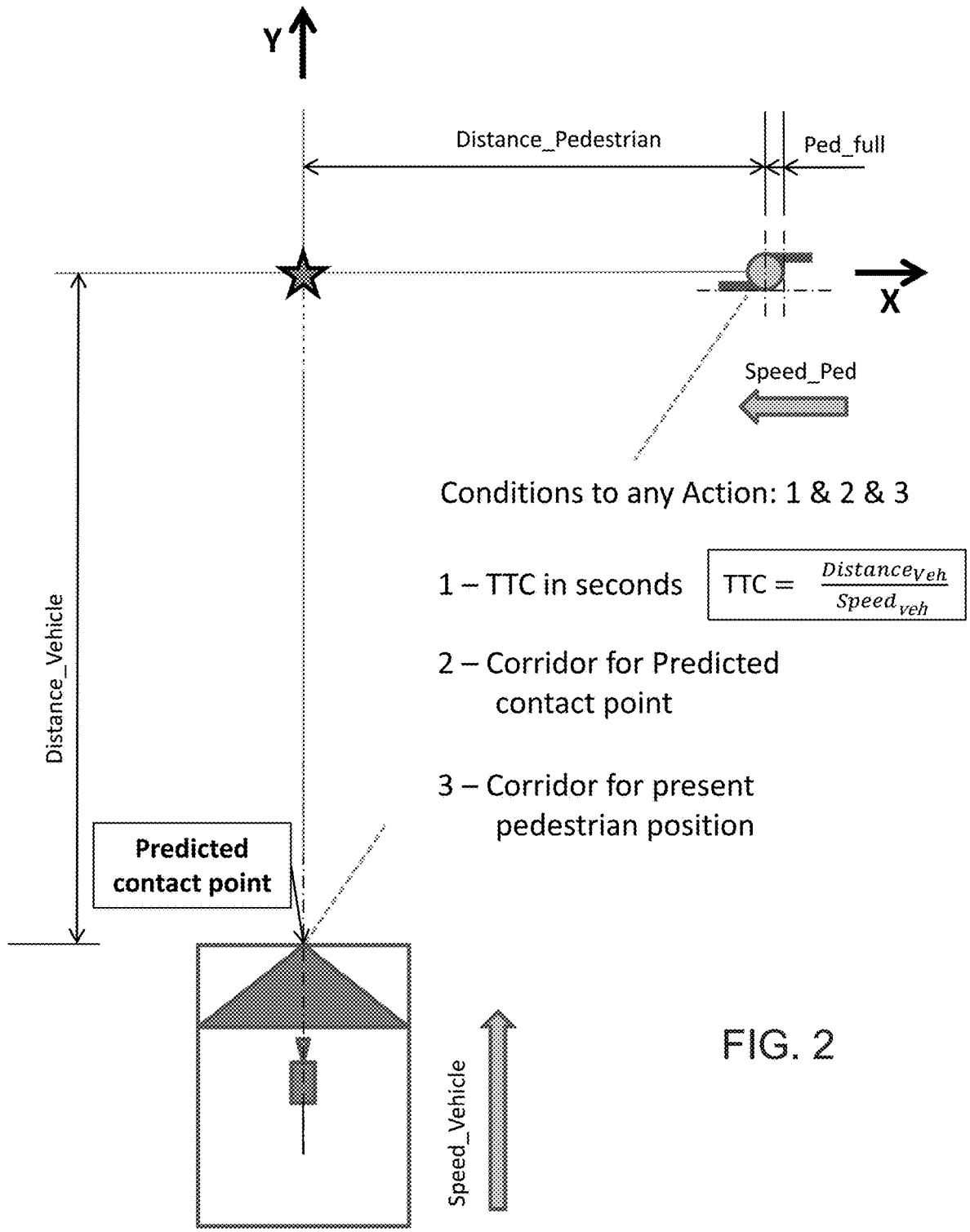
FIG. 2 is a schematic showing a vehicle approaching a path of a pedestrian.
Figure 3:
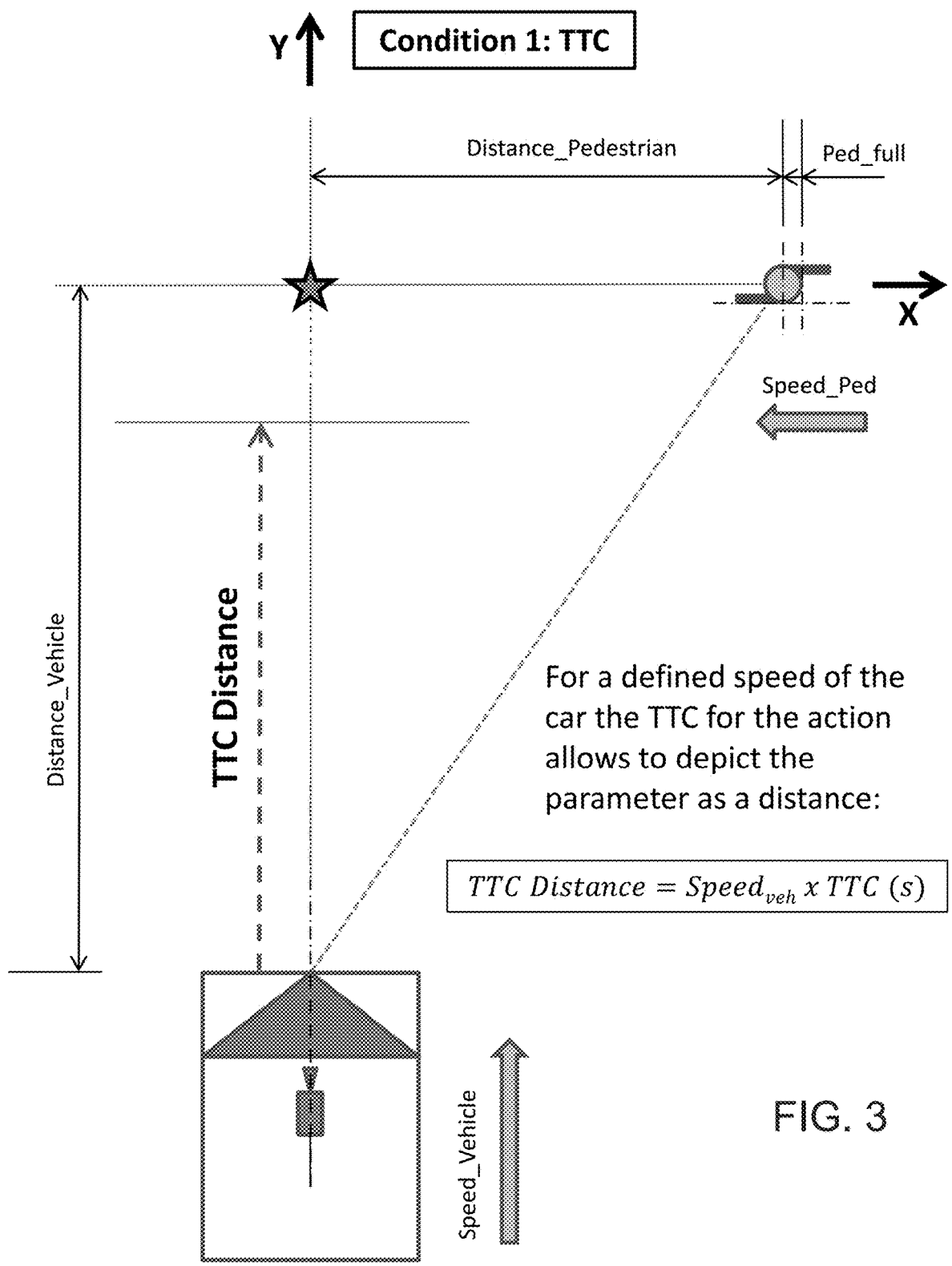
FIG. 3 is another schematic showing a vehicle approaching a path of a pedestrian.
Figure 4:
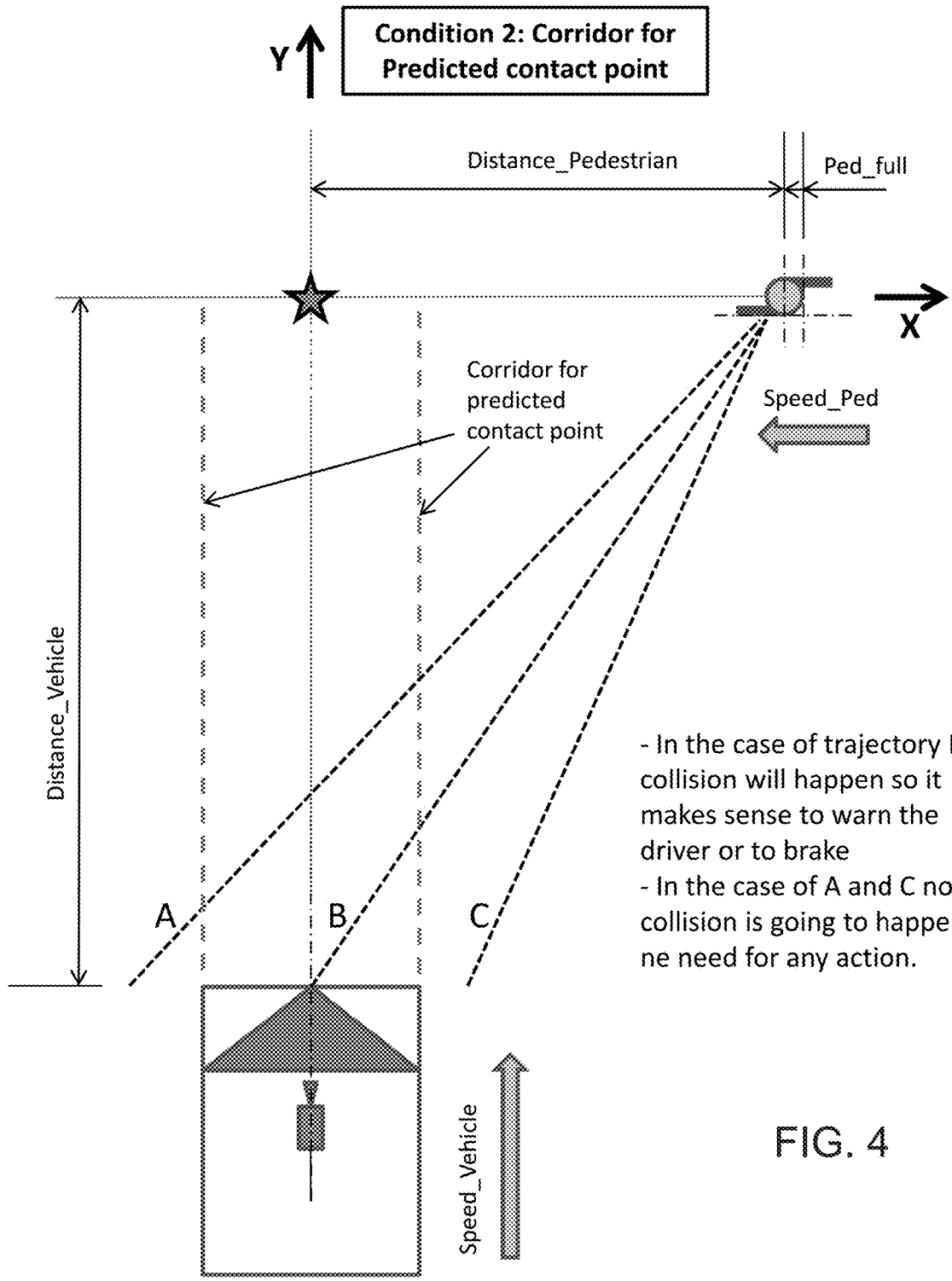
FIG. 4 is another schematic showing a vehicle approaching a path of a pedestrian, showing various trajectories of the pedestrian relative to the vehicle depending on the speed of the pedestrian and the speed of the vehicle.
Figure 5:
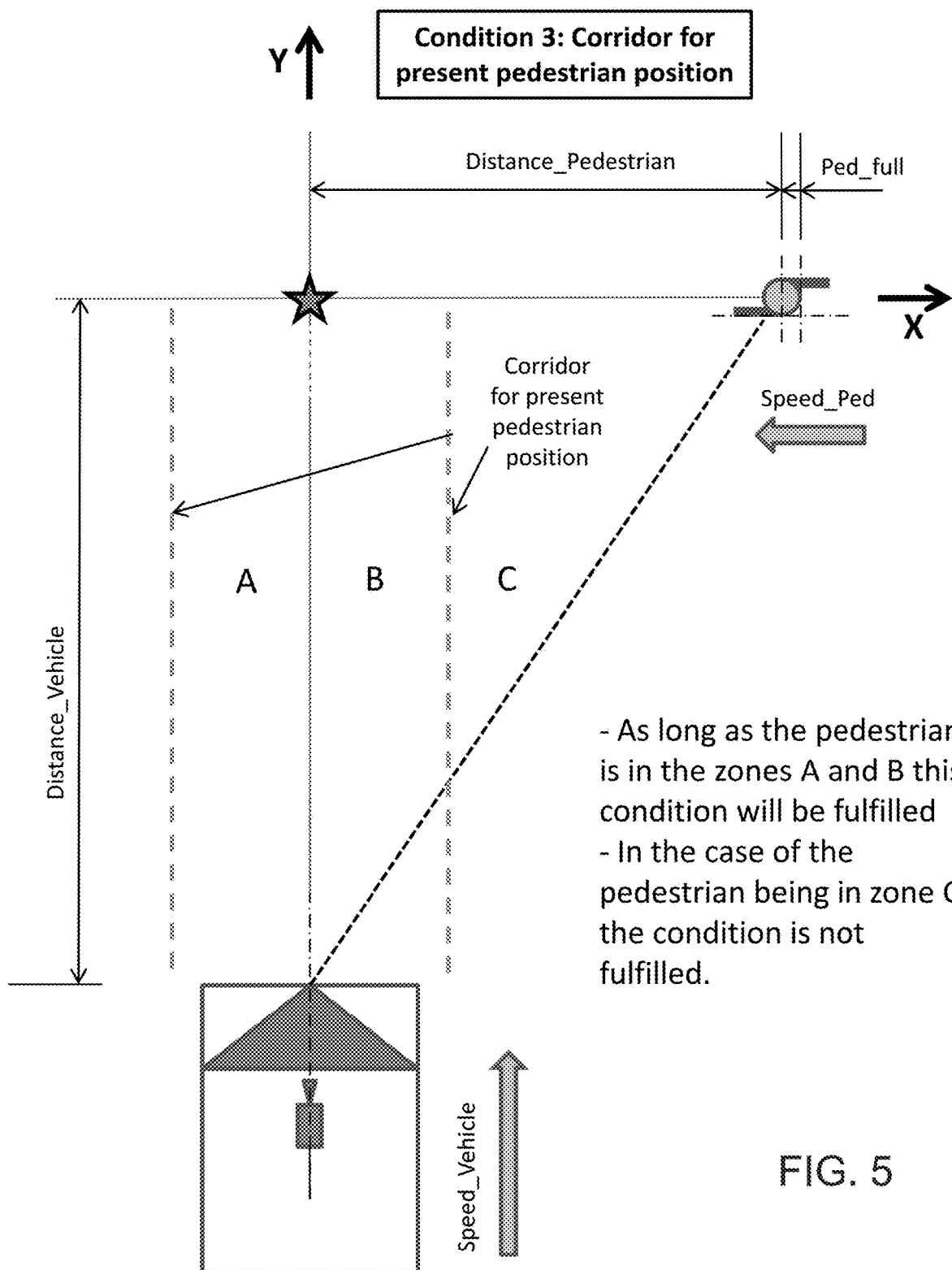
FIG. 5 is a schematic showing a vehicle approaching a path of a pedestrian.

FIG. 2 shows a diagram of the basic TTC calculation. The calculation assumes a contact point in the center of the vehicle, a constant vehicle speed and a constant speed of the pedestrian. In FIG. 3, the remaining distance to the collision point is calculated out of vehicle speed and TTC. The corridor (B) in which a pedestrian (or other vulnerable road user or VRU) with a constant approaching speed may be hit in is shown in FIGS. 4 and 5. Thus, if the pedestrian will be hit (at point B in FIG. 4 or to either side of B and within the determined path of travel corridor), the system may warn the driver and/or the pedestrian and/or may apply the vehicle brakes. Also shown in FIG. 4 is the case where the pedestrian walks faster so he or she passes the vehicle corridor before the vehicle arrives at his or her location (see A in FIG. 4). In case the pedestrian walks slower he or she will not reach the vehicle corridor before the vehicle arrives at his or her location (see C in FIG. 4).

Figure 6:
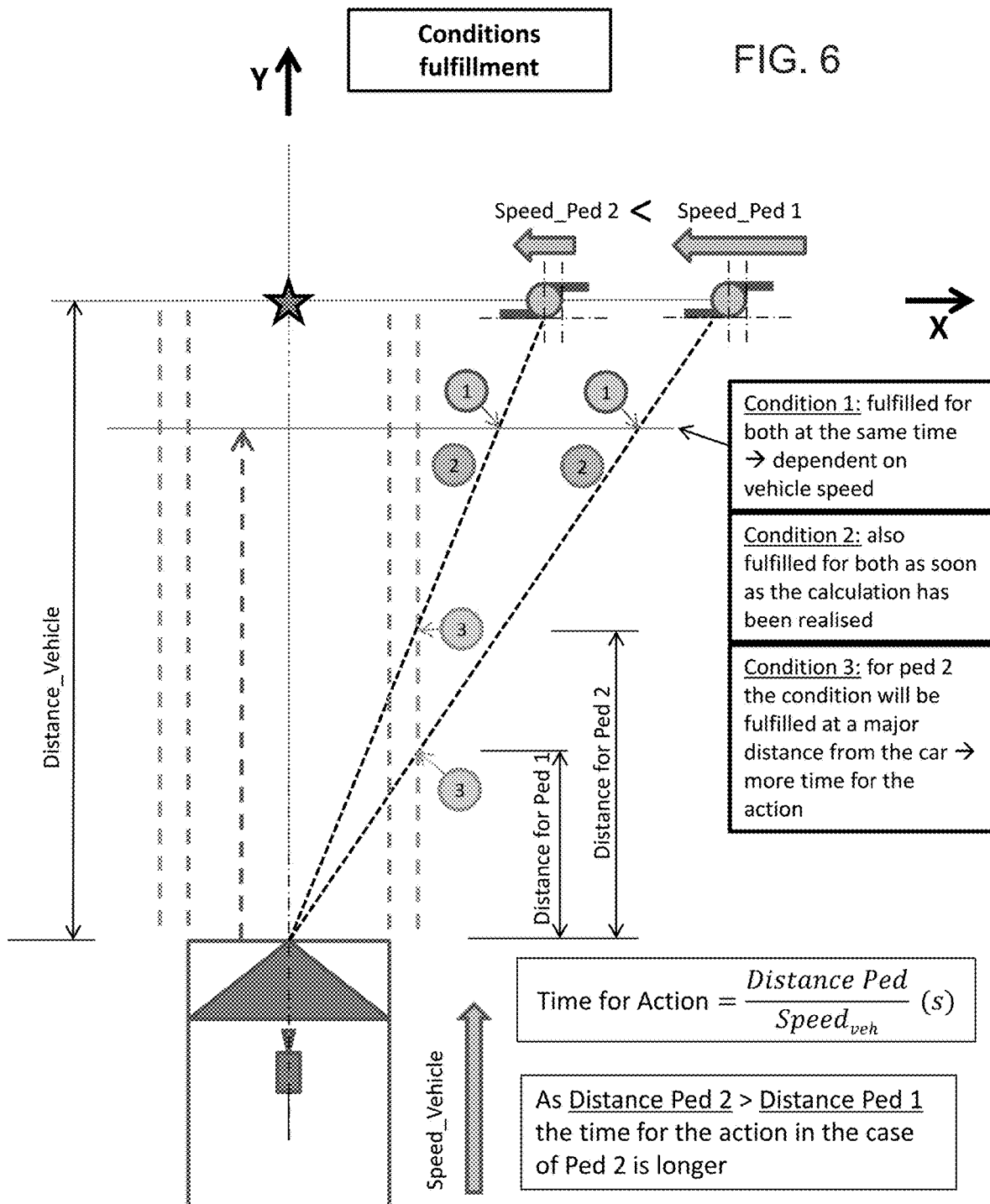
FIG. 6 is another schematic showing a vehicle approaching a path of a pedestrian, showing distances for warnings depending on various parameters.
Figure 7:
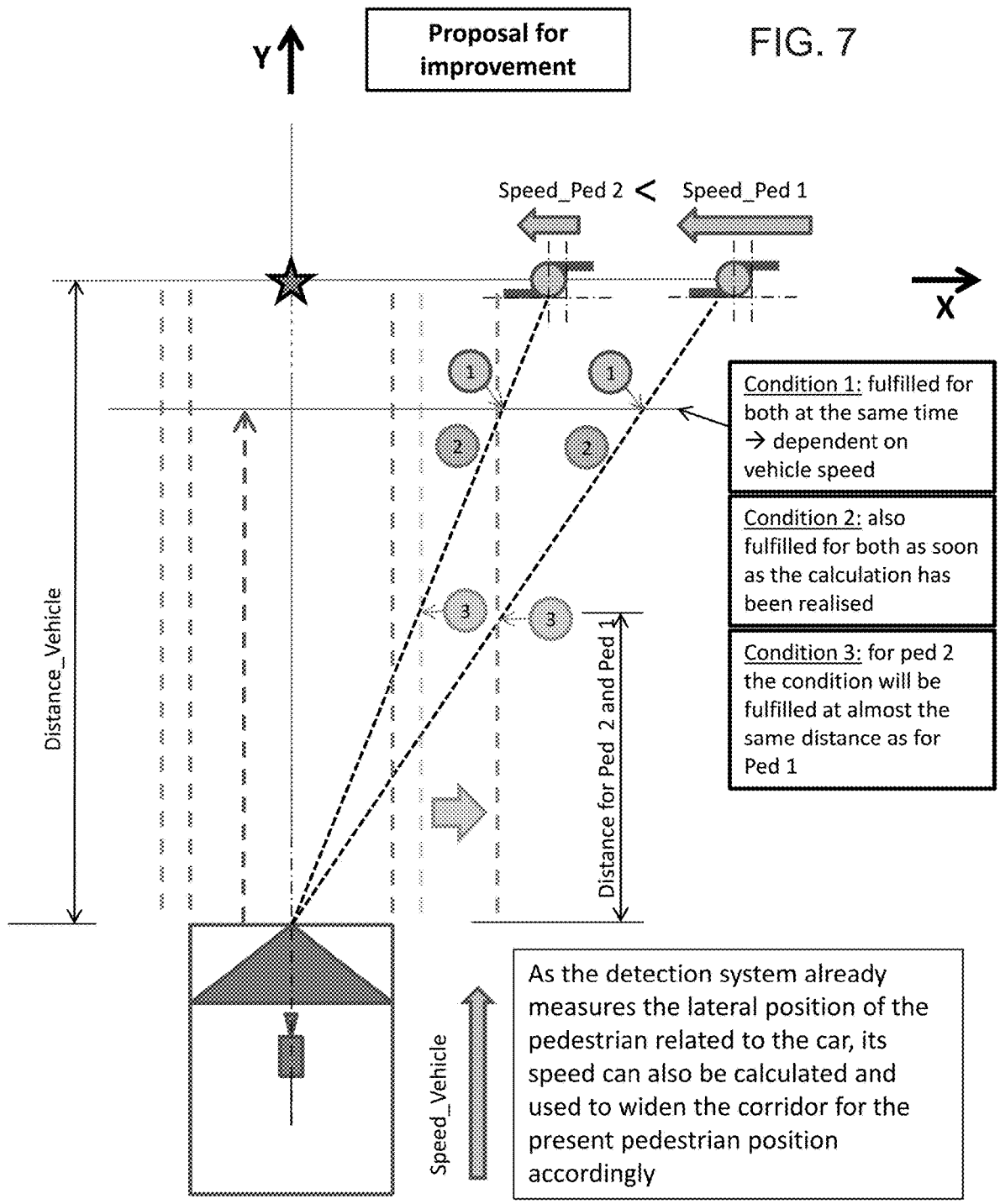
FIG. 7 is another schematic showing a vehicle approaching a path of a pedestrian.
Figure 8:
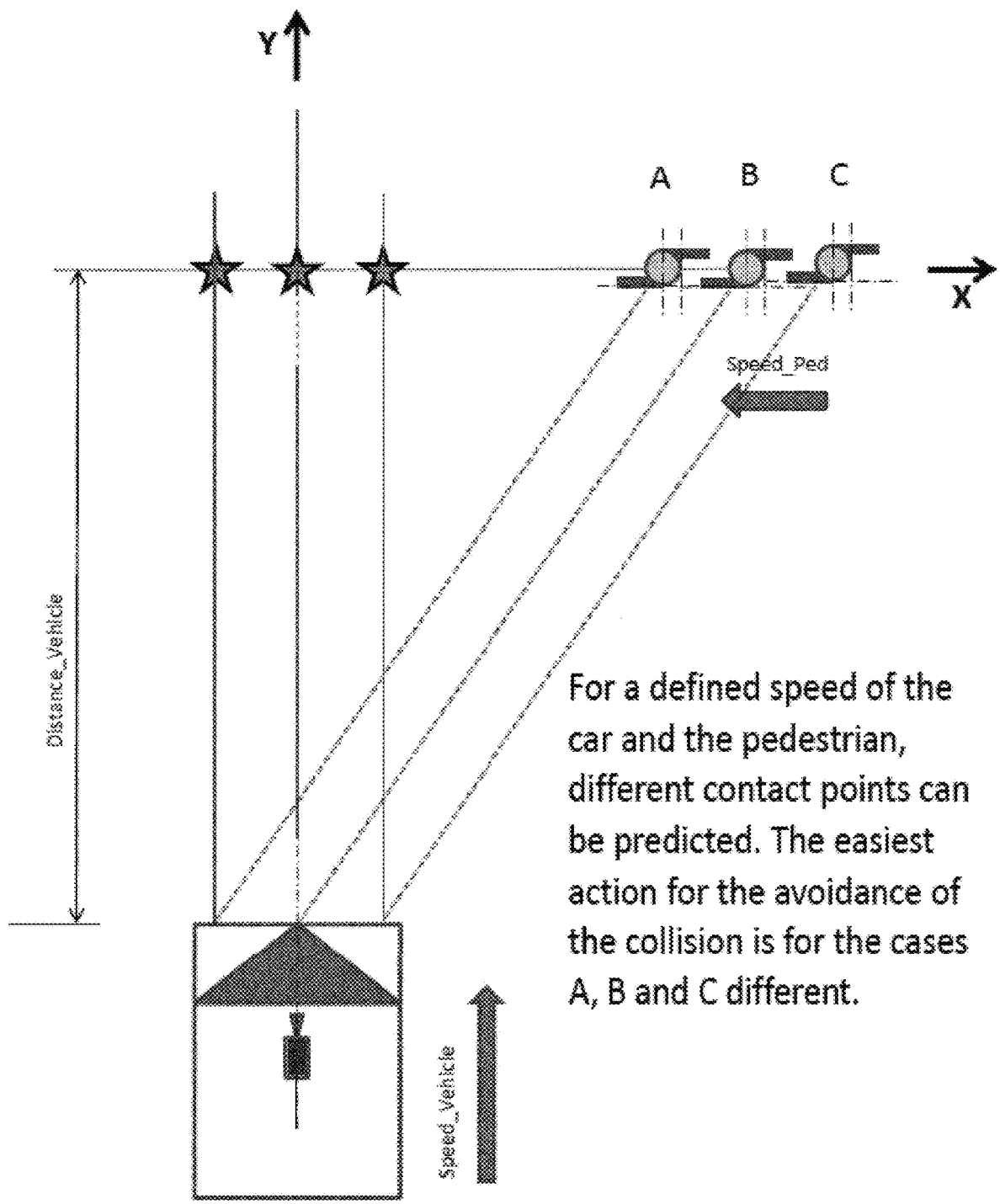
FIG. 8 shows cases A, B and C with a pedestrian walking with a constant speed into the path of travel of a vehicle with constant speed, starting from different starting points and by that being at different positions when the vehicle closes.
Figure 9:
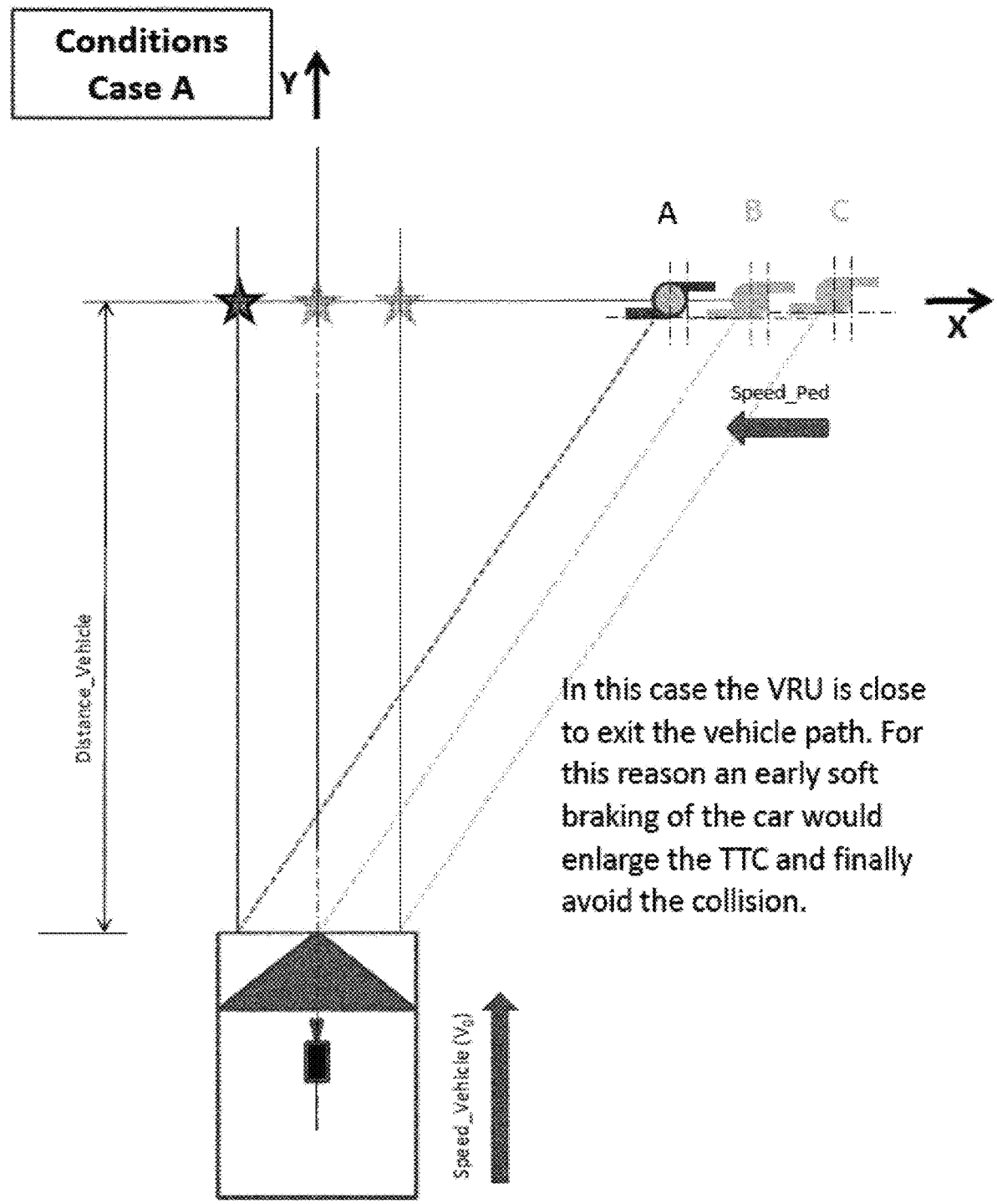
FIG. 9 shows further details of the case A of FIG. 8.

The diagrams in FIG. 6 shows different scenarios which apply depending on whether the pedestrian is walking faster or slower (or if the vehicle is traveling faster or slower), one starting from a more distant position than the other for arriving at the collision point at the same moment. The examples show that, with the same detection cone angle, a faster pedestrian starting from a higher distant position gets detected later, and by that the reaction time for him or her is shorter. FIG. 7 shows in which way the detection cone angle should be adapted depending on the vehicle speed for capturing a fast approaching pedestrian in time for safe braking of the vehicle. For example, and in accordance with the present invention, the vehicle's corridor may be effectively widened (reducing the determined time to collision) for a faster moving pedestrian (or responsive to other parameters as discussed below), such that the distance at which the system may act for both the slower moving pedestrian and the faster moving pedestrian is about the same. Thus, since the system already measures the lateral position of the pedestrian relative to the vehicle, the speed of the pedestrian can be determined and used to widen the corridor (shorten the determined TTC) for the pedestrian position at which the system determines that the vehicle and pedestrian may be on course for a collision. FIGS. 8 and 9 show that not the center but the far edges of the vehicle are relevant when it comes to barely hitting or missing a pedestrian walking in the way of travel of an approaching vehicle.

Figure 10:
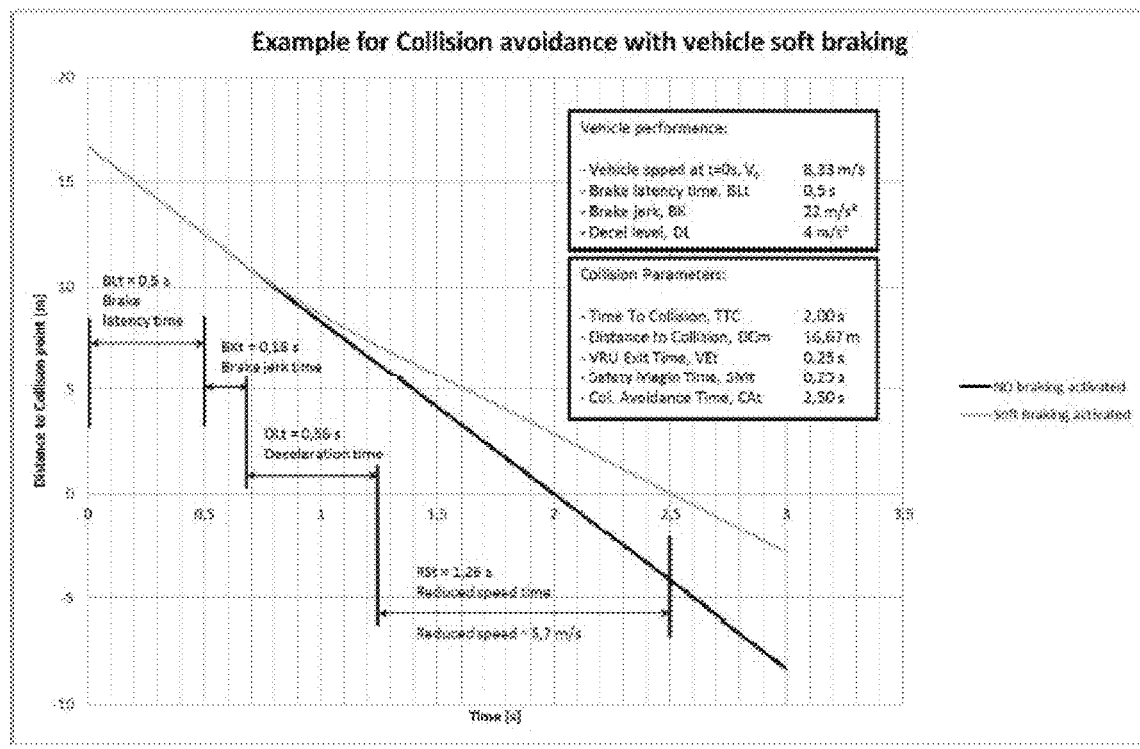
FIG. 10 shows a distance over time diagram (which implies the speed), from which it is apparent that an early soft braking (upon sufficient detection of a hazard) may be sufficient for winning the time which allows an inattentive pedestrian to escape or avoid being hit by the vehicle.
Figure 11:
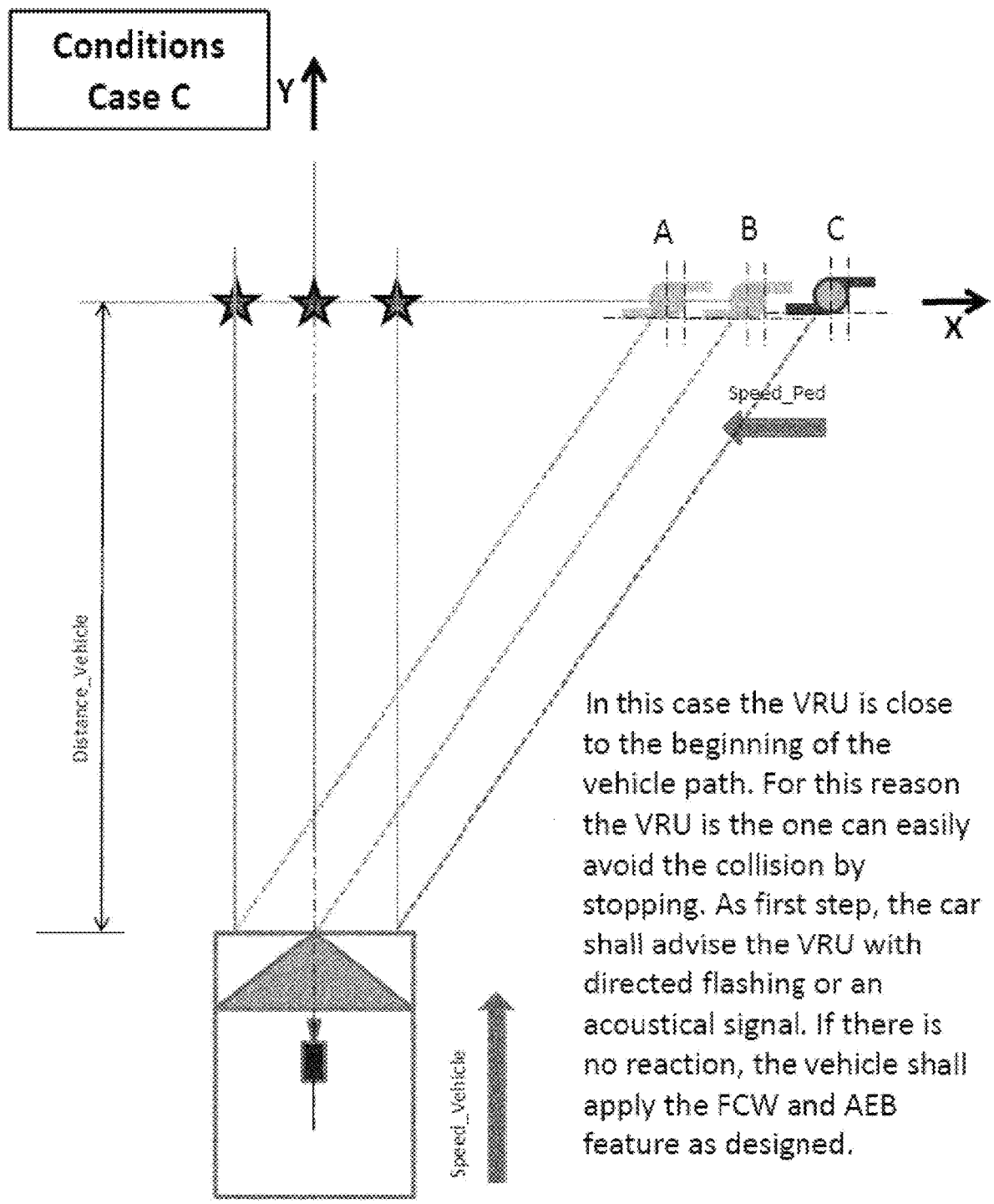
FIG. 11 shows further details of the case C of FIG. 8.

Since semi-automated abrupt accelerating may be disturbing to a driver for passing an approaching pedestrian before he or she may be able to enter the path of travel of the approaching vehicle, only deceleration may be acceptable as an automated measure. The case A in FIG. 9 shows that, for allowing an inattentive pedestrian to exit the path of travel of the own approaching vehicle, a small delay may be sufficient. FIG. 10 shows a distance over time diagram (which implies the speed), from which it is apparent that an early soft braking (upon sufficient detection of a hazard) may be sufficient for gaining sufficient time which allows an inattentive pedestrian to escape or avoid collision. This soft braking early may be much safer for pedestrians and more comfortable to vehicle occupants as compared to waiting to the last moment and then applying or engaging full braking to avoid or rescue an endangered pedestrian. As can be seen in FIG. 11, since the time to engage measures is comparably high, the vehicle may flash its lights or may acoustically signal to the pedestrian. When this does not help, it may engage forward collision warning (FCW) and/or automated emergency braking (AEB) of the vehicle.

As another aspect of the invention, for implementation in active pedestrian collision avoidance or collision warning systems, it is preferred to engage actions stepwise depending on the remaining time to collision (TTC). Typically, in a first stage actuation or warning levels become elevated. Audible, visual and/or haptic measures may be actuated to draw the driver's attention to a potential collision endangered pedestrian (assuming the pedestrian continues approaching the driving path of the vehicle). The systems are often not developed enough to avoid a collision by steering (in combination with braking), by that these are meant to brake only. In another higher actuation or warning levels when the TTC is shorter, the system may prefill the brake pressure and may actively lower the torque demand of the engine. The warnings may be switched to become more obtrusive such as like sounding a beep and warning lights may flicker. At a TTC when a collision seems to become unavoidable in case of not braking the vehicle may start full braking of the vehicle.

While the last stages of actuation or warning levels may be reached very seldom, the lower levels may be reached quite often. To limit or avoid disturbing the driver too often with false positive or obviously easy to avoid conflict warnings but to brake sufficiently when it is necessary for pedestrians' safety, the OEMs aspire to optimize the parameters which lead to the early warning or warning levels. This is done by parameters.

There is a base TTC at which a system may actuate early warnings. Most of the parameters lead to earlier warnings which equates to a higher TTC value. For simplifying the concept some OEMs quantize the parameters in levels which lead to a fixed value of time which has to be added to the base TTC (from a baseline time). Any count of levels may be used. The OEM typically use three levels, such as a level for 'wiper status.' A level of 3 (such as engaged in heavy rain) leads to an addition of 0.6 seconds to the TTC, while a level of 1 (such as 'Interval,' engaged in slight rain) leads to an addition of 0.2 seconds to the TTC.

Known other parameters include:
Headlight condition
Steering Wheel angle
Yaw rate
Count of pedestrians
Pedestrian size (such for distinguishing children from adults—children may be more at risk)

The system of the present invention uses additional vehicle imminent parameters in determining an adjustment of the TTC (where the system may reduce the alert time if the system determines excessive tire wear or excessive brake temperature or wear or the like, where a time to stop the vehicle may be increased), such as:
Tire wear
Tire pressure
Tire age
Vehicle load (or common weight)
Brake temperature
Brake wear (effectiveness)

Additionally, the system of the present invention may also take environmental and/or temporal parameters (where the system may reduce the alert time if conditions are such that a time to stop the vehicle may be increased) into account such as:
Ambient Temperature
Weather conditions
Time of day
Date or season A more sophisticated system may be able to detect ground or road or vehicle tire-road interface conditions. This may done by assessing the tire slip (where the system may reduce the alert time if conditions are such that a time to stop the vehicle may be increased). Such information may be generated by the ABS and TCS (traction control system) of the vehicle. Alternatively, or additionally, the system may assume a road condition by the weather forecast or may receive the road condition from a data server, specific to the position the vehicle is at that moment.

The geographical location or position may come from a navigation system with GPS. Additionally or alternatively the system may have parameters according a position dependent context information. The vehicle may use the inherent present information or may receive information from a context server. For example, at times when the navigation system indicates the system is approaching a school, the context parameter may add a higher value to the base TTC than when driving on a highway (where no pedestrian are to be expected normally).

Additional contexts at which increased or decreased parameter levels may be engaged may pertain to the current geographical location of the vehicle (where the system may reduce the alert time if the geographical location of the vehicle is at or near a location where more pedestrians are expected to be), and may include, for example:
In city
Out of city
In living area
On highway
Off road
Close to a bus stop
Close to a train station
Within a pedestrian walking zone
On a play street Some contexts may be engaged in combination, such as condition, time and place in combination (where the timing of an event that occurs at a particular location at a particular time may be considered when the vehicle is determined to be at or near a particular location at or near the time for an event at that location, such that the alert time may be reduced if the system determines that the vehicle is at or near such a location at such a time) such as:
Close to a stadium when a game just ended (position, game schedule and time)
Close to a bus stop with the bus scheduled at that time (position, bus schedule and time)
Approaching a traffic jam that is at a full stop (people may exit their cars) (road type and traffic condition)
Fire alert in a building close by (exceptional event and position)

There may be off line data involved such as the map information or the bus schedule as well as online data such as the fire alert event. Sophisticated systems may keep the bus schedule updated online, by that a bus which is a minute delayed can be reflected in the TTC parameters correctly when the bus is actually present (not when it was scheduled instead).

As another aspect of the present invention, the system may also take the condition of the driver and or driver distractions into account as a parameter (where the system may reduce the alert time if it is determined that the driver may be distracted or inattentive) such as:
Attention and/or drowsiness level of the driver (detected by an eye tracker and or by monitoring gas pedal and steering wheel actuations)
Volume of music in the vehicle
Driver is on a cellphone (hands free/not hands free)
Driver is drunk or otherwise impaired
Driver is beginner
Driver is an elderly driver
Driver is alone in the vehicle vs. accompanied by one or more passengers in the vehicle Optionally, the same procedure may be used accordingly and simultaneously for setting (increasing) the parameters of "Present position of the Pedestrian."

This procedure may also be used for TTC parameters of cyclists, motorcyclists, rickshaws, horse riders (vulnerable road users or VRU) or other vehicles or animals or other (potentially moving) obstacles such as dropped cargo (rolling around), rolling bushes or toys (e.g., balls, RC or autonomous crafts or drones); it means all AEB features can take advantage of the adjustment of the adaption of the thresholds for warnings or braking maneuvers.

Thus, the system of the present invention is operable to adjust or weight the processing of data associated with the vehicle traveling along a road to optimize the system's ability to warn against or avoid collision with a pedestrian. The system may increase the sensitivity of the alert (to effectively widen the vehicle path corridor in FIG. 7) to provide the alert (or to control the vehicle brake system or the like) earlier (by reducing a time to alert) responsive to parameters that are indicative of an increased likelihood that a pedestrian may be present in or near the path of travel of the vehicle and/or that are indicative of poor driving conditions (such as rain or snow or poor traction) that may require additional time and distance to stop the vehicle when the brakes are applied. The system is thus responsive to vehicle parameters (pertaining to traction or braking ability of the vehicle at that time), environmental parameters, location parameters (such as the location of the vehicle being at or near where a pedestrian is more likely to be found), condition/time/place parameters (such as the location of the vehicle being at or near a location and at a particular time where a pedestrian is more likely to be found at that location) and/or driver parameters (attentiveness of driver, distractions and/or the like), and adjusts the vehicle control or warning time and/or intensity responsive to such parameters. For example, when the vehicle is at a location near a bus stop when the bus is at the bus stop (thus a high likelihood that pedestrians will be present), the system may increase the sensitivity (and reduce the time to alert) and provide an earlier warning to the driver of the vehicle or may control the vehicle (such as apply the vehicle brakes) at an earlier time, when it is determined that a pedestrian may be moving in or towards the path of travel of the vehicle.

Thus, the system of the present invention uses vehicle inherent parameters to influence the TTC warning time (at which the driver will be alerted to a potential collision with a pedestrian). The system may also or otherwise use environmental parameters and may generate context information from several input conditions, which influence the various parameters and the TTC warning time. The system may utilize one or more cameras of the vehicle to assist in determining the presence of pedestrians and may be responsive to an output of a GPS system of the vehicle (that indicates the current geographical location of the vehicle) and/or may be responsive to an external service provider or communication system (that may provide data pertaining to bus schedules or real time bus locations and/or school crossing information and/or weather details and/or the like). The system may be responsive to the various parameters (as provided or determined or as adjusted in response to other inputs or data) to determine a time at which the system may warn the driver of the vehicle of a potential hazard (collision with pedestrian) as the vehicle is driven along a road.

Thus, the system may initially determine a potential hazard or collision with a pedestrian and generate an alert to the driver of the vehicle that the hazardous condition has been determined. If the pedestrian continues on his or her path and the driver of the vehicle does not alter the vehicle's path or speed, the system may then control the vehicle and/or generate a pedestrian alert to alert the pedestrian of the potentially hazardous condition. For example, responsive to an initial determination that a detected pedestrian is moving towards the path of travel of the vehicle, the system may generate a pedestrian alert (such as actuating the vehicle's horn or flashing the vehicle's headlights) to alert the pedestrian of a potential hazard. If the pedestrian does not alter course, the system may (if a determination is made that the vehicle may collide with the pedestrian) apply the vehicle brakes to slow down or stop the vehicle before arriving at the location where the pedestrian crosses the vehicle's path. This may be done after the processor determines a time to collision based on a determined distance to the pedestrian and determined speed of the pedestrian and speed of the vehicle, and after the collision avoidance system generates an alert to the driver of the vehicle at a threshold time before the determined collision with the pedestrian.

The collision avoidance system may be operable to apply the brakes of the vehicle to avoid collision with a determined pedestrian. Optionally, the system may adjust the degree of braking responsive to the predicted location of the pedestrian at the time that the vehicle arrives at the pedestrian's path. For example, the system may gently or lightly apply the brakes to slow the vehicle's speed responsive to a determination that the pedestrian will be exiting the path of travel of the vehicle towards the end of the determined time to collision (i.e., the pedestrian is fully or almost fully across the vehicle path by the time the vehicle arrives at the pedestrian's path). Optionally, the collision avoidance system may apply the brakes of the vehicle to stop the vehicle responsive to a determination that the pedestrian will be entering the path of travel of the vehicle towards the end of the determined time to collision (i.e., the pedestrian will likely be in the path of travel of the vehicle at the time that the vehicle arrives at the pedestrian's path). Optionally, the collision avoidance system may generate a pedestrian alert to the pedestrian responsive to a determination that the pedestrian will be entering the path of travel of the vehicle towards the end of the determined time to collision (i.e., at or before the time at which the vehicle arrives at the pedestrian's path).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular collision avoidance system, the vehicular collision avoidance system comprising:

a forward-viewing camera disposed at a windshield of a vehicle equipped with the vehicular collision avoidance system, the forward-viewing camera viewing forward through the windshield of the vehicle;

wherein the forward-viewing camera comprises an imaging sensor having at least one million photosensing elements arranged in rows and columns;

an image processor that processes image data captured by the forward-viewing camera to determine presence of a pedestrian who is present ahead of the vehicle and is outside of a forward path of travel of the vehicle;

wherein the vehicular collision avoidance system, responsive at least in part to processing of image data captured by the forward-viewing camera, determines a projected path of travel of the pedestrian based on movement of the pedestrian;

wherein the vehicular collision avoidance system, based at least in part on current speed of the vehicle, determines a vehicle time to intersection, and wherein the vehicle time to intersection is the time needed for the vehicle to reach where the forward path of travel of the vehicle intersects the projected path of travel of the pedestrian based on the vehicle continuing to move along its forward path of travel at the current speed of the vehicle;

wherein the vehicular collision avoidance system predicts a location where the pedestrian will be along the projected path of travel of the pedestrian when the vehicle time to intersection elapses based at least in part on processing of image data captured by the forward-viewing camera;

wherein, responsive at least in part to a prediction that the pedestrian will be in the forward path of travel of the vehicle when the vehicle time to intersection elapses, the vehicular collision avoidance system adjusts control of the vehicle so that the pedestrian will not be in the forward path of travel of the vehicle when the vehicle arrives where the forward path of travel of the vehicle intersects the projected path of travel of the pedestrian; and wherein the vehicular collision avoidance system, responsive at least in part to the prediction that the pedestrian will be in the forward path of travel of the vehicle when the vehicle time to intersection elapses, adjusts control of the vehicle based at least in part on (i) attentiveness of a driver of the vehicle and (ii) a driving condition of the vehicle.

2. The vehicular collision avoidance system of claim 1, wherein the vehicular collision avoidance system, responsive at least in part to the prediction that the pedestrian will be in the forward path of travel of the vehicle when the vehicle time to intersection elapses, adjusts control of the vehicle based at least in part on a driving condition parameter indicative of the driving condition of the vehicle.

3. The vehicular collision avoidance system of claim 2, wherein the driving condition parameter comprises a vehicle parameter indicative of the driving condition of the vehicle and pertaining to current traction of the vehicle.

4. The vehicular collision avoidance system of claim 3, wherein the driving condition parameter comprises a vehicle parameter indicative of the driving condition of the vehicle and pertaining to at least one selected from the group consisting of (i) tire pressure, (ii) vehicle load and (iii) brake temperature.

5. The vehicular collision avoidance system of claim 3, wherein the driving condition parameter comprises a vehicle parameter indicative of the driving condition of the vehicle and pertaining to at least one selected from the group consisting of (i) tire wear, (ii) tire age, (iii) brake wear and (iv) tire slip.

6. The vehicular collision avoidance system of claim 2, wherein the driving condition parameter comprises an environment parameter indicative of the driving condition of the vehicle and pertaining to the environment in which the vehicle is traveling.

7. The vehicular collision avoidance system of claim 6, wherein the environment parameter indicative of the driving condition of the vehicle includes at least one selected from the group consisting of (i) a determined ambient temperature at the vehicle, (ii) a determined weather condition, (iii) the current date and (iv) the current season.

8. The vehicular collision avoidance system of claim 2, wherein the driving condition parameter comprises a location parameter indicative of the driving condition of the vehicle and pertaining to a current geographical location of the vehicle.

9. The vehicular collision avoidance system of claim 8, wherein the location parameter indicative of the driving condition of the vehicle includes at least one parameter pertaining to the vehicle being at a location selected from the group consisting of (i) a highway location, (ii) an in city location, (iii) an out of city location, (iv) a residential location and (v) an off road location.

10. The vehicular collision avoidance system of claim 1, wherein the driving condition of the vehicle comprises a condition that affects the ability to control deceleration of the vehicle.

11. The vehicular collision avoidance system of claim 1, wherein the vehicular collision avoidance system, responsive at least in part to the prediction that the pedestrian will be in the forward path of travel of the vehicle when the vehicle time to intersection elapses, adjusts control of the vehicle based at least in part on a location and time parameter pertaining to a current geographical location of the vehicle and a particular event time associated with that location.

12. The vehicular collision avoidance system of claim 11, wherein the location and time parameter includes at least one selected from the group consisting of (i) a determination that the vehicle is close to a stadium when an event just ended, (ii) a determination that the vehicle is close to a bus stop with the bus scheduled at that time, (iii) a determination that the vehicle is approaching a traffic jam that is at a full stop at that time and (iv) a determination of a fire alert in a building near to the current geographical location of the vehicle.

13. The vehicular collision avoidance system of claim 1, wherein the attentiveness of the driver of the vehicle includes at least one selected from the group consisting of (i) a determined attention level of the driver of the vehicle, (ii) a determined drowsiness level of the driver of the vehicle, (iii) a determined volume of music in the vehicle, (iv) a determination that the driver is using a cellphone in the vehicle and (v) a determination of at least one passenger in the vehicle.

14. The vehicular collision avoidance system of claim 1, wherein the vehicular collision avoidance system adjusts control of the vehicle responsive to a prediction that the pedestrian would, when the vehicle time to intersection elapses, be in the forward path of travel of the vehicle and closer to the side of the forward path of travel of the vehicle opposite from the side toward where the pedestrian is initially determined to be present.

15. The vehicular collision avoidance system of claim 1, wherein the vehicular collision avoidance system stops the vehicle responsive to a prediction that the pedestrian would enter the forward path of travel of the vehicle when or before the vehicle time to intersection elapses and would be in the forward path of travel of the vehicle and closer to the side of the forward path of travel of the vehicle toward which the pedestrian is initially determined to be present when the vehicle time to intersection elapses.

16. The vehicular collision avoidance system of claim 1, wherein the vehicular collision avoidance system generates a pedestrian alert to the pedestrian responsive to the prediction that the pedestrian would be in the forward path of travel of the vehicle when the vehicle time to intersection elapses.

17. The vehicular collision avoidance system of claim 1, wherein, responsive to determination that the pedestrian will be in the forward path of travel of the vehicle when the vehicle time to intersection elapses, the vehicular collision avoidance system generates an alert to the driver of the vehicle.

18. The vehicular collision avoidance system of claim 17, wherein the vehicular collision avoidance system adjusts the time at which to generate the alert based at least in part on the driving condition of the vehicle.

19. The vehicular collision avoidance system of claim 17, wherein the vehicular collision avoidance system adjusts the time at which to generate the alert based at least in part on the attentiveness of the driver of the vehicle.

20. The vehicular collision avoidance system of claim 1, wherein the vehicular collision avoidance system adjusts control of the vehicle by adjusting speed of the vehicle.

21. The vehicular collision avoidance system of claim 20, wherein the vehicular collision avoidance system adjusts the speed of the vehicle by controlling a braking system of the vehicle.

22. The vehicular collision avoidance system of claim 21, wherein, responsive to the prediction that the pedestrian will be in the forward path of travel of the vehicle when the vehicle time to intersection elapses, the vehicular collision avoidance system reduces the speed of the vehicle so that the pedestrian will have sufficient time to move across the forward path of travel of the vehicle before the vehicle arrives where the forward path of travel of the vehicle intersects the projected path of travel of the pedestrian.

23. The vehicular collision avoidance system of claim 1, wherein the vehicular collision avoidance system, responsive to processing of image data captured by the forward-viewing camera, determines a distance from the pedestrian to where the forward path of travel of the vehicle intersects the projected path of travel of the pedestrian, and wherein the vehicular collision avoidance system predicts a location where the pedestrian will be along the projected path of travel of the pedestrian when the vehicle time to intersection elapses based on the distance from the pedestrian to where the forward path of travel of the vehicle intersects the projected path of travel of the pedestrian.

24. The vehicular collision avoidance system of claim 1, wherein the vehicular collision avoidance system, responsive to processing of image data captured by the forward-viewing camera, determines speed of movement of the pedestrian, and wherein the vehicular collision avoidance system predicts a location where the pedestrian will be along the projected path of travel of the pedestrian when the vehicle time to intersection elapses based on the determined moving speed of the pedestrian.

25. A vehicular collision avoidance system, the vehicular collision avoidance system comprising:
   a forward-viewing camera disposed at a windshield of a vehicle equipped with the vehicular collision avoidance system, the forward-viewing camera viewing forward through the windshield of the vehicle;
   wherein the forward-viewing camera comprises an imaging sensor having at least one million photosensing elements arranged in rows and columns;
   an image processor that processes image data captured by the forward-viewing camera to determine presence of a pedestrian who is present ahead of the vehicle and is outside of a forward path of travel of the vehicle;
   wherein the vehicular collision avoidance system, responsive at least in part to processing of image data captured by the forward-viewing camera, determines a projected path of travel of the pedestrian based on movement of the pedestrian;
   wherein the vehicular collision avoidance system, based at least in part on current speed of the vehicle, determines a vehicle time to intersection, and wherein the vehicle time to intersection is the time needed for the vehicle to reach where the forward path of travel of the vehicle intersects the projected path of travel of the pedestrian based on the vehicle continuing to move along its forward path of travel at the current speed of the vehicle;
   wherein the vehicular collision avoidance system predicts a location where the pedestrian will be along the projected path of travel of the pedestrian when the vehicle time to intersection elapses based at least in part on processing of image data captured by the forward-viewing camera;
   wherein, responsive at least in part to a prediction that the pedestrian will be in the forward path of travel of the vehicle when the vehicle time to intersection elapses, the vehicular collision avoidance system adjusts control of the vehicle so that the pedestrian will not be in the forward path of travel of the vehicle when the vehicle arrives where the forward path of travel of the vehicle intersects the projected path of travel of the pedestrian;
   wherein the vehicular collision avoidance system adjusts control of the vehicle based at least in part on (i) attentiveness of a driver of the vehicle and (ii) a driving condition of the vehicle;
   wherein the attentiveness of the driver of the vehicle includes at least one selected from the group consisting of (i) a determined attention level of the driver of the vehicle, (ii) a determined drowsiness level of the driver of the vehicle and (iii) a determination that the driver is using a cellphone in the vehicle; and
   wherein the driving condition of the vehicle comprises a condition that affects the ability to control deceleration of the vehicle.

26. The vehicular collision avoidance system of claim 25, wherein the vehicular collision avoidance system, responsive at least in part to the prediction that the pedestrian will be in the forward path of travel of the vehicle when the vehicle time to intersection elapses, adjusts control of the vehicle based at least in part on a driving condition parameter indicative of the driving condition of the vehicle.

27. The vehicular collision avoidance system of claim 26, wherein the driving condition comprises a vehicle parameter indicative of the driving condition of the vehicle and pertaining to current traction of the vehicle.

28. The vehicular collision avoidance system of claim 27, wherein the driving condition parameter comprises a vehicle parameter indicative of the driving condition of the vehicle and pertaining to at least one selected from the group consisting of (i) tire pressure, (ii) vehicle load and (iii) brake temperature.

29. The vehicular collision avoidance system of claim 27, wherein the driving condition parameter comprises a vehicle parameter indicative of the driving condition of the vehicle and pertaining to at least one selected from the group consisting of (i) tire wear, (ii) tire age, (iii) brake wear and (iv) tire slip.

30. The vehicular collision avoidance system of claim 26, wherein the driving condition parameter comprises an environment parameter indicative of the driving condition of the vehicle and pertaining to the environment in which the vehicle is traveling.

31. The vehicular collision avoidance system of claim 30, wherein the environment parameter indicative of the driving condition of the vehicle includes at least one selected from the group consisting of (i) a determined ambient temperature at the vehicle, (ii) a determined weather condition, (iii) the current date and (iv) the current season.

32. The vehicular collision avoidance system of claim 25, wherein the vehicular collision avoidance system adjusts control of the vehicle responsive to a prediction that the pedestrian would, when the vehicle time to intersection elapses, be in the forward path of travel of the vehicle and closer to the side of the forward path of travel of the vehicle opposite from the side toward where the pedestrian is initially determined to be present.

33. The vehicular collision avoidance system of claim 25, wherein the vehicular collision avoidance system stops the vehicle responsive to a prediction that the pedestrian would enter the forward path of travel of the vehicle when or before the vehicle time to intersection elapses and would be in the forward path of travel of the vehicle and closer to the side of the forward path of travel of the vehicle toward which the pedestrian is initially determined to be present when the vehicle time to intersection elapses.

34. The vehicular collision avoidance system of claim 25, wherein the vehicular collision avoidance system generates a pedestrian alert to the pedestrian responsive to the prediction that the pedestrian would be in the forward path of travel of the vehicle when the vehicle time to intersection elapses.

35. The vehicular collision avoidance system of claim 25, wherein, responsive to determination that the pedestrian will be in the forward path of travel of the vehicle when the vehicle time to intersection elapses, the vehicular collision avoidance system generates an alert to the driver of the vehicle.

36. The vehicular collision avoidance system of claim 35, wherein the vehicular collision avoidance system adjusts the time at which to generate the alert based at least in part on the driving condition of the vehicle.

37. The vehicular collision avoidance system of claim 35, wherein the vehicular collision avoidance system adjusts the time at which to generate the alert based at least in part on the attentiveness of the driver of the vehicle.

38. The vehicular collision avoidance system of claim 25, wherein the vehicular collision avoidance system adjusts control of the vehicle by adjusting speed of the vehicle.

39. The vehicular collision avoidance system of claim 38, wherein the vehicular collision avoidance system adjusts the speed of the vehicle by controlling a braking system of the vehicle.

40. The vehicular collision avoidance system of claim 39, wherein, responsive to the prediction that the pedestrian will be in the forward path of travel of the vehicle when the vehicle time to intersection elapses, the vehicular collision avoidance system reduces the speed of the vehicle so that the pedestrian will have sufficient time to move across the forward path of travel of the vehicle before the vehicle arrives where the forward path of travel of the vehicle intersects the projected path of travel of the pedestrian.

41. The vehicular collision avoidance system of claim 25, wherein the vehicular collision avoidance system, responsive to processing of image data captured by the forward-viewing camera, determines a distance from the pedestrian to where the forward path of travel of the vehicle intersects the projected path of travel of the pedestrian, and wherein the vehicular collision avoidance system predicts a location where the pedestrian will be along the projected path of travel of the pedestrian when the vehicle time to intersection elapses based on the distance from the pedestrian to where the forward path of travel of the vehicle intersects the projected path of travel of the pedestrian.

42. The vehicular collision avoidance system of claim 25, wherein the vehicular collision avoidance system, responsive to processing of image data captured by the forward-viewing camera, determines speed of movement of the pedestrian, and wherein the vehicular collision avoidance system predicts a location where the pedestrian will be along the projected path of travel of the pedestrian when the vehicle time to intersection elapses based on the determined moving speed of the pedestrian.

43. A vehicular collision avoidance system, the vehicular collision avoidance system comprising:
   a forward-viewing camera disposed at a windshield of a vehicle equipped with the vehicular collision avoidance system, the forward-viewing camera viewing forward through the windshield of the vehicle;
   wherein the forward-viewing camera comprises an imaging sensor having at least one million photosensing elements arranged in rows and columns;
   an image processor that processes image data captured by the forward-viewing camera to determine presence of a pedestrian who is present ahead of the vehicle and is outside of a forward path of travel of the vehicle;
   wherein the vehicular collision avoidance system, responsive at least in part to processing of image data captured by the forward-viewing camera, determines a projected path of travel of the pedestrian based on movement of the pedestrian;
   wherein the vehicular collision avoidance system, based at least in part on current speed of the vehicle, determines a vehicle time to intersection, and wherein the vehicle time to intersection is the time needed for the vehicle to reach where the forward path of travel of the vehicle intersects the projected path of travel of the pedestrian based on the vehicle continuing to move along its forward path of travel at the current speed of the vehicle;
   wherein the vehicular collision avoidance system predicts a location where the pedestrian will be along the projected path of travel of the pedestrian when the vehicle time to intersection elapses based at least in part on processing of image data captured by the forward-viewing camera;
   wherein, responsive at least in part to a prediction that the pedestrian will be in the forward path of travel of the vehicle when the vehicle time to intersection elapses, the vehicular collision avoidance system adjusts control of the vehicle so that the pedestrian will not be in the forward path of travel of the vehicle when the vehicle arrives where the forward path of travel of the vehicle intersects the projected path of travel of the pedestrian;
   wherein the vehicular collision avoidance system adjusts control of the vehicle based at least in part on (i) attentiveness of a driver of the vehicle and (ii) an environment in which the vehicle is traveling; and
   wherein the environment includes at least a determined weather condition.

44. The vehicular collision avoidance system of claim 43, wherein the environment includes at least one selected from the group consisting of (i) a determined ambient temperature at the vehicle, (ii) the current date and (iii) the current season.

45. The vehicular collision avoidance system of claim 43, wherein the vehicular collision avoidance system, responsive at least in part to the prediction that the pedestrian will be in the forward path of travel of the vehicle when the vehicle time to intersection elapses, adjusts control of the vehicle based at least in part on a location and time parameter pertaining to a current geographical location of the vehicle and a particular event time associated with that location.

46. The vehicular collision avoidance system of claim 45, wherein the location and time parameter includes at least one selected from the group consisting of (i) a determination that the vehicle is close to a stadium when an event just ended, (ii) a determination that the vehicle is close to a bus stop with the bus scheduled at that time, (iii) a determination that the vehicle is approaching a traffic jam that is at a full stop at that time and (iv) a determination of a fire alert in a building near to the current geographical location of the vehicle.

47. The vehicular collision avoidance system of claim 43, wherein the attentiveness of the driver of the vehicle includes at least one selected from the group consisting of (i) a determined attention level of the driver of the vehicle, (ii) a determined drowsiness level of the driver of the vehicle, (iii) a determined volume of music in the vehicle, (iv) a determination that the driver is using a cellphone in the vehicle and (v) a determination of at least one passenger in the vehicle.

48. The vehicular collision avoidance system of claim 43, wherein the vehicular collision avoidance system adjusts control of the vehicle responsive to a prediction that the pedestrian would, when the vehicle time to intersection elapses, be in the forward path of travel of the vehicle and closer to the side of the forward path of travel of the vehicle opposite from the side toward where the pedestrian is initially determined to be present.

49. The vehicular collision avoidance system of claim 43, wherein the vehicular collision avoidance system stops the vehicle responsive to a prediction that the pedestrian would enter the forward path of travel of the vehicle when or before the vehicle time to intersection elapses and would be in the forward path of travel of the vehicle and closer to the side of the forward path of travel of the vehicle toward which the pedestrian is initially determined to be present when the vehicle time to intersection elapses.

50. The vehicular collision avoidance system of claim 43, wherein the vehicular collision avoidance system generates a pedestrian alert to the pedestrian responsive to the prediction that the pedestrian would be in the forward path of travel of the vehicle when the vehicle time to intersection elapses.

51. The vehicular collision avoidance system of claim 43, wherein, responsive to determination that the pedestrian will be in the forward path of travel of the vehicle when the vehicle time to intersection elapses, the vehicular collision avoidance system generates an alert to the driver of the vehicle.

52. The vehicular collision avoidance system of claim 51, wherein the vehicular collision avoidance system adjusts the time at which to generate the alert based at least in part on the environment in which the vehicle is traveling.

53. The vehicular collision avoidance system of claim 51, wherein the vehicular collision avoidance system adjusts the time at which to generate the alert based at least in part on the attentiveness of the driver of the vehicle.

54. The vehicular collision avoidance system of claim 43, wherein the vehicular collision avoidance system adjusts control of the vehicle by adjusting speed of the vehicle.

55. The vehicular collision avoidance system of claim 54, wherein the vehicular collision avoidance system adjusts the speed of the vehicle by controlling a braking system of the vehicle.

56. The vehicular collision avoidance system of claim 55, wherein, responsive to the prediction that the pedestrian will be in the forward path of travel of the vehicle when the vehicle time to intersection elapses, the vehicular collision avoidance system reduces the speed of the vehicle so that the pedestrian will have sufficient time to move across the forward path of travel of the vehicle before the vehicle arrives where the forward path of travel of the vehicle intersects the projected path of travel of the pedestrian.

57. The vehicular collision avoidance system of claim 43, wherein the vehicular collision avoidance system, responsive to processing of image data captured by the forward-viewing camera, determines a distance from the pedestrian to where the forward path of travel of the vehicle intersects the projected path of travel of the pedestrian, and wherein the vehicular collision avoidance system predicts a location where the pedestrian will be along the projected path of travel of the pedestrian when the vehicle time to intersection elapses based on the distance from the pedestrian to where the forward path of travel of the vehicle intersects the projected path of travel of the pedestrian.

58. The vehicular collision avoidance system of claim 43, wherein the vehicular collision avoidance system, responsive to processing of image data captured by the forward-viewing camera, determines speed of movement of the pedestrian, and wherein the vehicular collision avoidance system predicts a location where the pedestrian will be along the projected path of travel of the pedestrian when the vehicle time to intersection elapses based on the determined moving speed of the pedestrian.

\* \* \* \* \*